United States Patent

[11] 3,580,534

| [72] | Inventor | L. E. Lindsey |
| | | 222 Vista Ave., Pasadena, Calif. 91107 |
| [21] | Appl. No. | 833,360 |
| [22] | Filed | June 16, 1969 |
| [45] | Patented | May 25, 1971 |

[54] SUSPENSION BRACKET FOR CONDUCTOR INSULATOR
5 Claims, 3 Drawing Figs.

[52] U.S. Cl............................................. 248/221,
52/40, 174/45
[51] Int. Cl............................................. H02g 7/20
[50] Field of Search............................................. 248/221,
63, 65, 230; 174/140, 45, 158; 52/28, 40

[56] References Cited
UNITED STATES PATENTS

| 484,565 | 10/1892 | Allison et al.............. | 248/221X |
| 3,342,925 | 9/1967 | Lewis et al............. | 174/45 |
| 3,347,572 | 10/1967 | Pfaff et al.............. | 248/221X |

Primary Examiner—Roy D. Frazier
Assistant Examiner—J. Franklin Foss
Attorney—Sellers and Brace ABSTRACT: A triangular suspension bracket for supporting a power conductor offset from a pole or the like and having one member in tension and two longer underlying diverging legs loaded in compression and supplementing one another in resisting sidewise sway.

Patented May 25, 1971 3,580,534
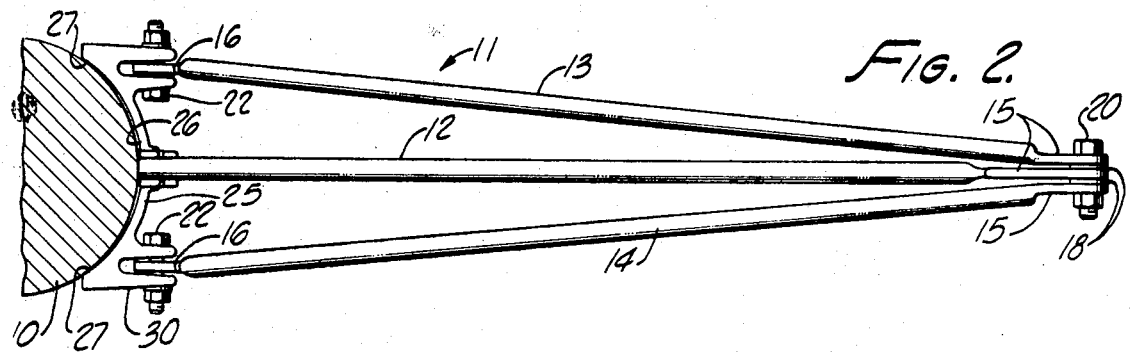
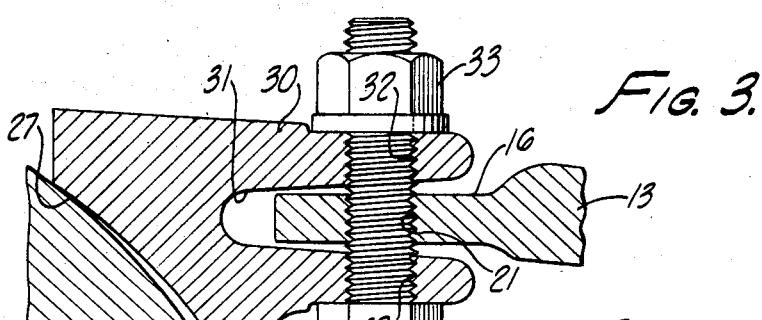
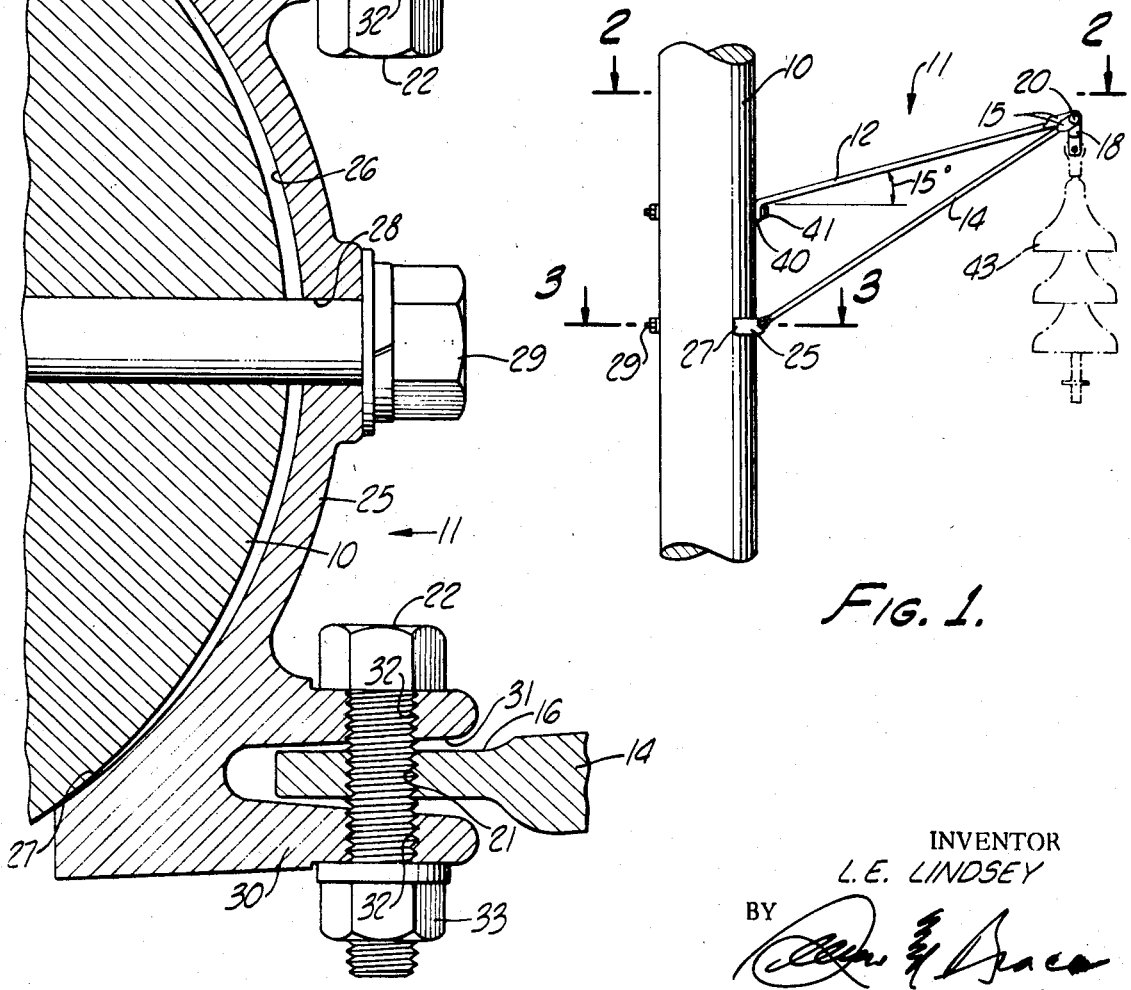
INVENTOR
L.E. LINDSEY
BY
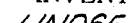
ATTORNEYS.

SUSPENSION BRACKET FOR CONDUCTOR INSULATOR

This invention relates to suspension brackets for power conductors and more particularly to a simpler, more rugged and efficient bracket designed for mounting against the side of a support pole.

A principal purpose of this invention is to provide a high-efficiency slim line, high-strength suspension bracket for a power conductor. A maximum of strength and reliability is provided utilizing a minimum amount of inexpensive materials easily fabricated from mill stock along with a mounting base plate readily formed ductile cast iron. In a preferred embodiment the bracket body comprises three elongated rodlike rigid members in a triangular configuration with the longer upper rod loaded in tension and the two longer lower diverging strut members loaded in compression. The insulator is suspended from the rigidly interlocated converged outer ends of these three rods. The divergent pole ends of the two longer rods are rigidly clamped at the outer ends of a common base plate embracing the side of the pole and cooperate in resisting sideways forces acting longitudinally of the support conductor.

The outer ends of the rods are rigidly connected together and the lower ends of the diverging struts have a snug frictional fit with the threads of fastener means threaded snugly into the base plate. The snug fit of the parts prevents arcing of leakage currents from the power conductor and likely to cause radio interference and undesirable electrical noise.

Accordingly, it is a primary object of the present invention to provide an improved high-efficiency low-cost fail-safe suspension bracket for power conductors.

Another object of the invention is the provision of a three-legged suspension bracket for conductors adapted to be secured to an upright pole with one member loaded in tension and two others loaded in compression and cooperating to resist sidesway.

Another object of the invention is the provision of a three-legged suspension bracket for power conductors comprising three load bearing members secured together to form a three-sided pyramid of high load-supporting and side-sway resisting capability.

These and other more specific objects will appear upon reading the following specification and claims and upon considering in connection therewith the attached drawing to which they relate.

Referring now to the drawing in which a preferred embodiment of the invention is illustrated:

FIG. 1 is a fragmentary elevational view of a typical upright pole equipped with the invention suspension bracket;

FIG. 2 is a cross-sectional view on an enlarged scale taken along lines 2-2 on FIG. 1; and FIG. 3 is a cross-sectional view on an enlarged scale taken along line 3-3 on FIG. 1.

Referring initially to FIG. 1, there is shown a conventional power line pole 10 supporting the invention bracket designated generally 11. This bracket comprises an upper relatively short tension member 12 and a pair of identical underlying longer rigid strut members 13 and 14. The opposite ends of all three members are flattened as is indicated at 15 and 16 and an insulator suspension stirrup 18 is held rigidly sandwiched between the outer ends of members 12, 13 and 14 by clamping bolt 20. The pair of lower strut members 13, 14 are formed with a threaded opening 21 having a snug frictional fit with the threads of assembly bolt 22.

The two lower struts 13, 14 are secured to an arcuate base plate 25 preferably formed from ductile cast iron or cast steel. The concave face of this base plate is contoured to embrace the side of pole 10. Preferably, however, its surface 26 adjacent the pole has a radius somewhat less than that of the pole proper. In consequence and as is illustrated in FIG. 3, the outer ends 27 are in firm contact with the pole whereas its central area is spaced therefrom. This central area is provided with a single hole 28 for a mounting bolt 29 passing through a bore diametrically of pole 10. It will be appreciated from the foregoing that, upon being tightened, through bolt 29 is highly effective in forcing the outer ends 27 of plate 25 into high pressure contact with the adjacent surfaces of the pole, causing the ends 27 to become firmly seated against the pole and to resist any tendency of the base plate to pivot about the axis of bolt 29.

Cast integral with the opposite ends of base plate 26 is a bifurcated lug 30,30 each having a slot 31 readily accommodating the flattened end 16 of strut 13 or 14. Each of the lugs 30 has a threaded bore 32 having a snug frictional fit with the threads of bolt 22. Assembly of the struts to the base plate is accomplished by wrenching bolts 22 through one ear of lug 30, then through the threaded bore 21 in a strut and finally into the threads on the other side of lug 30. Owing to the tight frictional fit of all threads with the bolt threads there is little need for a cap nut 33 but a nut 33 may be and preferably is present as an extra safeguard. The snug fig of the bolt threads with lug 30 and with struts 13,14 avoids any possibility of leakage current customarily present in some degree in power line hardware from arcing and producing radio interference and electrical noise generally.

Referring now to FIG. 1 and to upper bracket member 12, it is pointed out that its lower end 40 is bent to one side and forming with an opening to receive mounting bolt 41 passing diametrically through a bore in pole 10.

The above-identified bracket assembly exhibits maximum strength for a given weight of material when upper bracket member 12 is inclined upwardly from the horizontal by approximately 15° and the spacing between mounting bolts 29, 41 is approximately 10 inches to 1 foot. Made in these proportions the centerline of insulator 43 is located approximately 30 inches from the near side of pole 10.

Such a suspension bracket provides an upwardly inclined three-sided pyramid defined by the three rigid members 12, 13 and 14 and pole 10. The three rigid members and base plate 25 constitute a fail-safe bracket strongly resisting the vertical and sidesway load forces imposed by a power conductor. If an excessive sidesway force is brought to bear on the outer end of the bracket, one or both of the struts 13, 14 is designed to fail by bending without breaking, with the result that the excessive load force merely distorts the bracket while continuing to support the conductor. This fail-safe characteristic is of very considerable importance in minimizing damage to the power line hardware and the length of time and labor required to restore service following an accident or other mishap to the line.

While the particular suspension bracket for conductor insulator herein shown and disclosed in detail is fully capable of attaining the objects and providing the advantages hereinbefore stated, it is to be understood that it is merely illustrative of the presently preferred embodiments of the invention and that no limitations are intended to the detail of construction or design herein shown other than as defined in the appended claims.

I claim:

1. A suspension bracket for use in supporting a power conductor insulator offset laterally from an upright pole, said bracket comprising three long rigid members converging upwardly toward one another at their outer ends, including a relatively shorter upper rigid tension member having its outer end rigidly sandwiched between the outer ends of a pair of relatively longer rigid struts having their lower ends diverging downwardly, means carried by said outer ends to support a high-tension insulator therefrom, a single arcuate base plate sized to embrace an upright pole in the area thereof between the downwardly diverging lower ends of said pair struts and provided with bifurcated lug means projecting outwardly away from the pole adjacent the lower ends of said pair of struts and lying generally parallel to one another, separate bolt means for securing said base plate and the end of said tension member to a pole in vertically spaced relation, and fastener means for rigidly securing the laterally diverging pole ends of each of said rigid struts to a respective one of said bifurcated lug means.

2. A suspension bracket as defined in claim 1 characterized in that the surface of said arcuate base plate facing the pole has a radius slightly shorter than the radius of said pole and a hole through the central portion thereof for a mounting bolt securing said base plate to the pole, whereby the tightening of said bolt acts to press the outer ends of said arcuate base plate into the pole to resist any tendency for said base plate to pivot about the axis of said bolt.

3. A suspension bracket as defined in claim 1 characterized in that the fastener means securing the diverging pole ends of said pair of rigid struts to said bifurcated lug means are threaded and having a snug frictional fit with threaded bores through said rigid strut means and said bifurcated lug means to prevent arcing of leakage current and the generation radio interference.

4. A suspension bracket as defined in claim 1 characterized in that said rigid struts comprise elongated rods having flattened ends each provided with a transverse opening for a fastener.

5. A suspension bracket as defined in claim 2 characterized in that said arcuate base plate is ductile cast iron coated with corrosion resistant material.